(12) United States Patent
Britt (10) Patent No.: US 10,127,794 B1
(45) Date of Patent: Nov. 13, 2018

(54) VEHICLE OCCUPANCY WARNING SYSTEM (71) Applicant: Debbie Britt, Poland, IN (US)

(72) Inventor: Debbie Britt, Poland, IN (US)

(*) Notice: Subject to any disclaimer, the term of this patent is extended or adjusted under 35 U.S.C. 154(b) by 0 days.

(21) Appl. No.: 15/628,035

(22) Filed: Jun. 20, 2017

(51) Int. Cl.
G08B 21/22 (2006.01)
B60N 2/00 (2006.01)
G08B 21/24 (2006.01)
B60R 25/10 (2013.01)

(52) U.S. Cl.
CPC ............ *G08B 21/22* (2013.01); *B60N 2/002* (2013.01); *B60R 25/1001* (2013.01); *G08B 21/24* (2013.01)

(58) Field of Classification Search
CPC .... B60N 2/002; B60N 2/26; B60R 21/01556; G08B 21/24; G08B 21/22; G08B 21/02; G08B 21/0205; B60Q 9/00
See application file for complete search history.

(56) References Cited

U.S. PATENT DOCUMENTS

| 6,535,137 | B1 | 3/2003 | Ryan |
| 6,812,844 | B1 | 11/2004 | Burgess |
| 6,847,302 | B2 | 1/2005 | Flanagan et al. |
| 6,922,147 | B1 | 7/2005 | Viksnins et al. |
| 7,218,218 | B1 | 5/2007 | Rogers |
| 7,319,382 | B1* | 1/2008 | Vu .......................... B60N 2/002 340/425.5 |
| 7,321,306 | B2 | 1/2008 | Lee et al. |
| D650,715 | S | 12/2011 | Hill et al. |
| 9,439,479 | B1* | 9/2016 | Vu ....................... A44B 11/2576 |
| 9,487,137 | B1* | 11/2016 | Castle ..................... B60Q 5/005 |
| 2003/0122662 | A1 | 7/2003 | Quinonez |
| 2007/0268119 | A1 | 11/2007 | Cram et al. |
| 2011/0080288 | A1* | 4/2011 | Younse ................... B60N 2/002 340/573.1 |
| 2015/0339896 | A1* | 11/2015 | Stagg ..................... G08B 17/113 340/521 |
| 2016/0042616 | A1* | 2/2016 | Dorsey ................... G08B 21/22 340/457 |
| 2016/0200250 | A1* | 7/2016 | Westmoreland ......... B60Q 9/00 340/457.1 |

* cited by examiner

*Primary Examiner* — Kerri McNally
*Assistant Examiner* — Kevin Lau (57) ABSTRACT A vehicle occupancy warning system includes a vehicle that has a door and a back seat. The back seat may have a child seated therein. The door is selectively positioned between an open position and a closed position. A sensing unit is coupled to the vehicle and the sensing unit is aligned with the door. The sensing unit senses when the door is positioned in the open position and the closed position. An alarm unit is positioned within the vehicle and the alarm unit is in electrical communication with the sensing unit. The alarm unit emits an audible alarm when the sensing unit senses that the door is in the open position. In this way the alarm unit reminds a driver to check for the child in the back seat thereby inhibiting the child from being left unattended in the vehicle.

12 Claims, 5 Drawing Sheets

VEHICLE OCCUPANCY WARNING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to warning devices and more particularly pertains to a new warning device for inhibiting a child from being left unattended in a vehicle.

BRIEF SUMMARY OF THE INVENTION

An embodiment of the disclosure meets the needs presented above by generally comprising a vehicle that has a door and a back seat. The back seat may have a child seated therein. The door is selectively positioned between an open position and a closed position. A sensing unit is coupled to the vehicle and the sensing unit is aligned with the door. The sensing unit senses when the door is positioned in the open position and the closed position. An alarm unit is positioned within the vehicle and the alarm unit is in electrical communication with the sensing unit. The alarm unit emits an audible alarm when the sensing unit senses that the door is in the open position. In this way the alarm unit reminds a driver to check for the child in the back seat thereby inhibiting the child from being left unattended in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
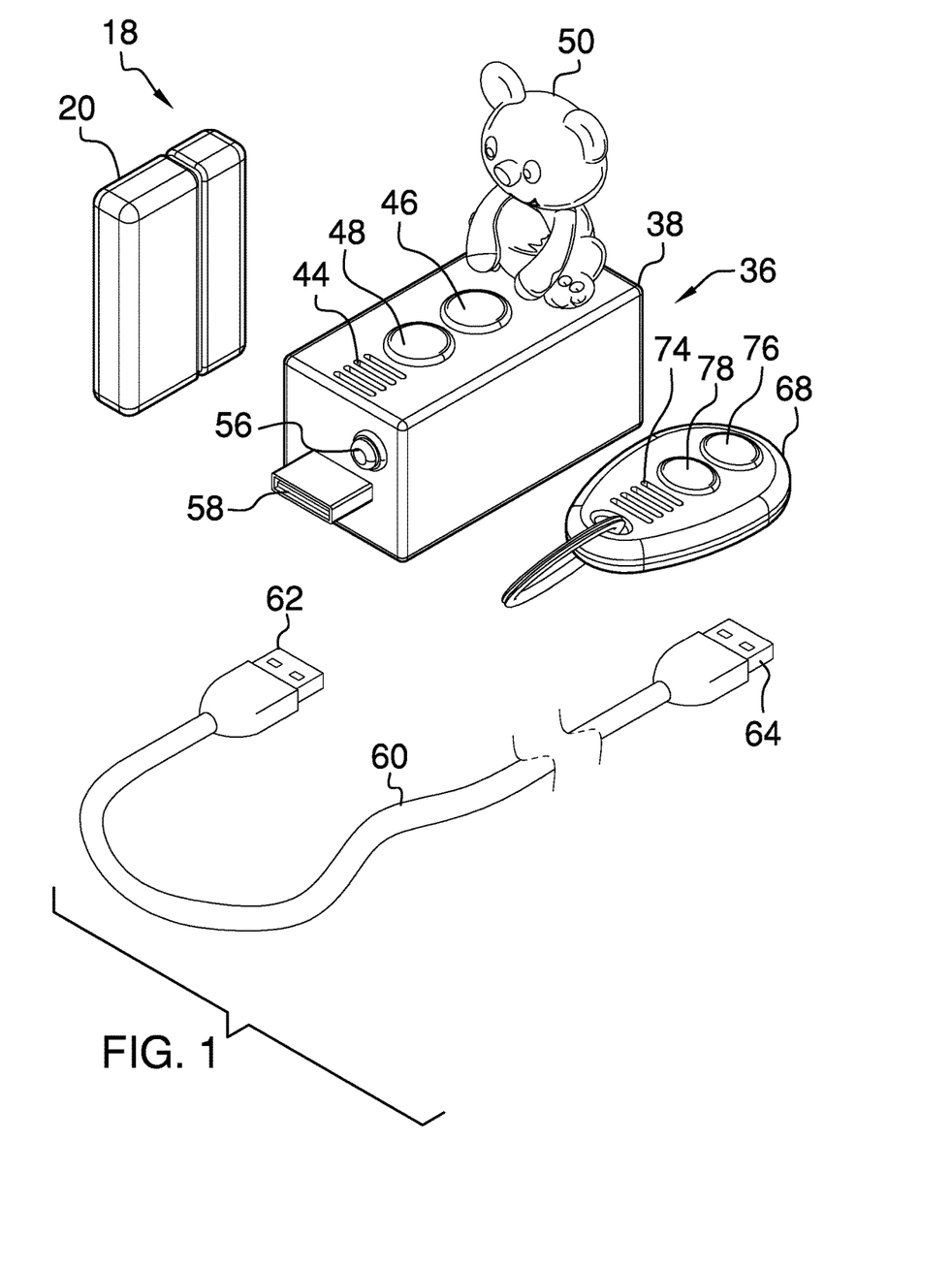
FIG. 1 is a perspective view of a vehicle occupancy warning system according to an embodiment of the disclosure.
Figure 2:
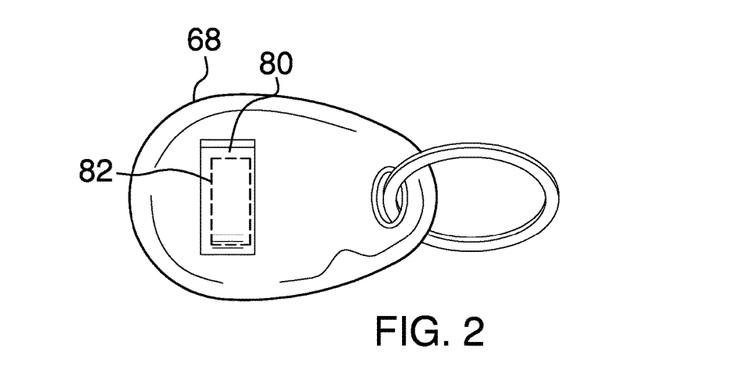
FIG. 2 is a bottom phantom view of fourth housing of an embodiment of the disclosure.
Figure 3:
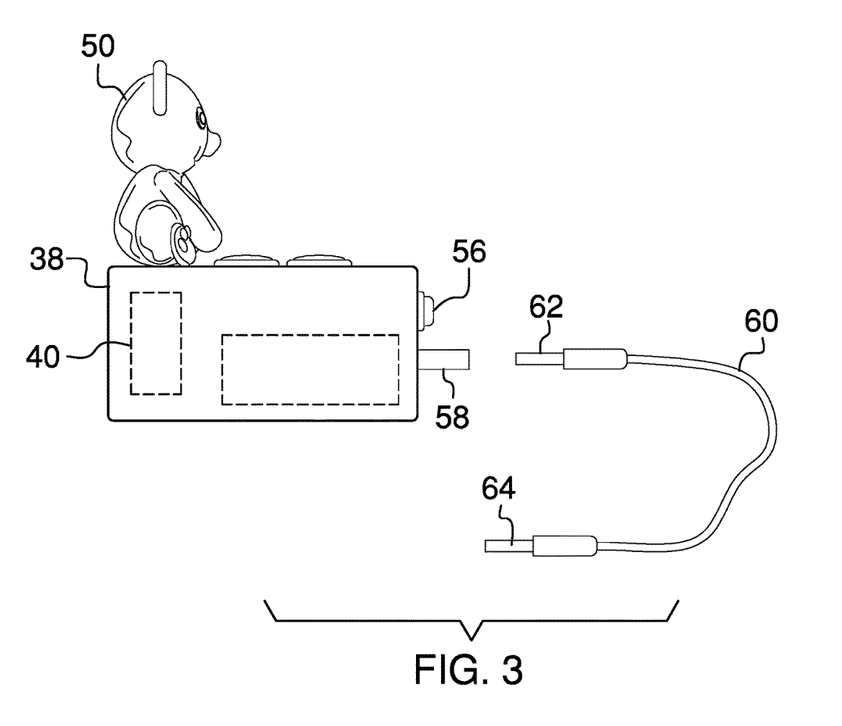
FIG. 3 is a right side phantom view of third housing of an embodiment of the disclosure.
Figure 4:
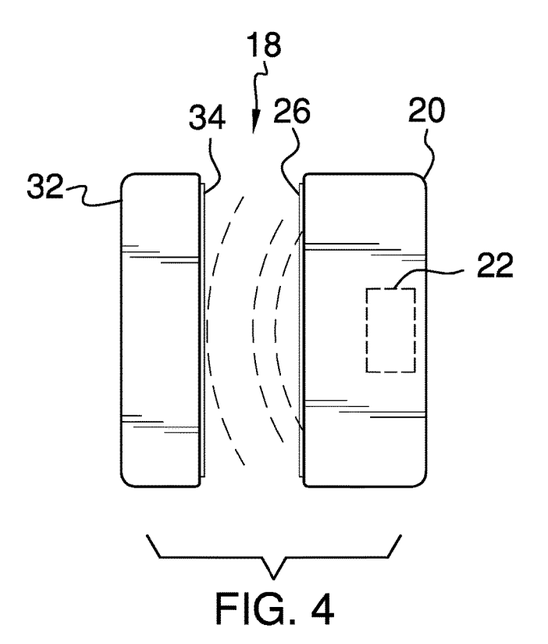
FIG. 4 is a front view of sensing unit of an embodiment of the disclosure.
Figure 5:
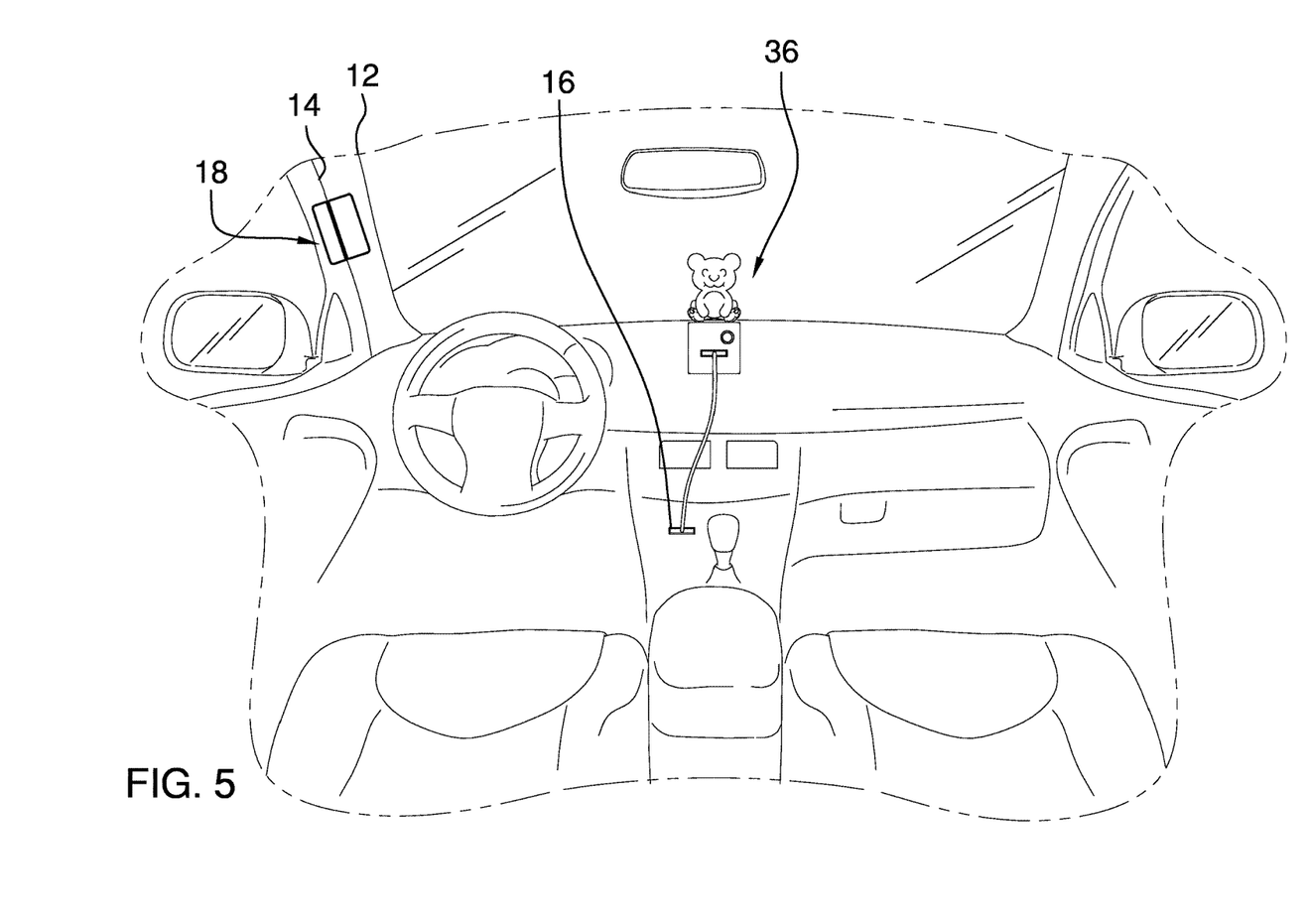
FIG. 5 is a perspective in-use view of an embodiment of the disclosure.
Figure 6:
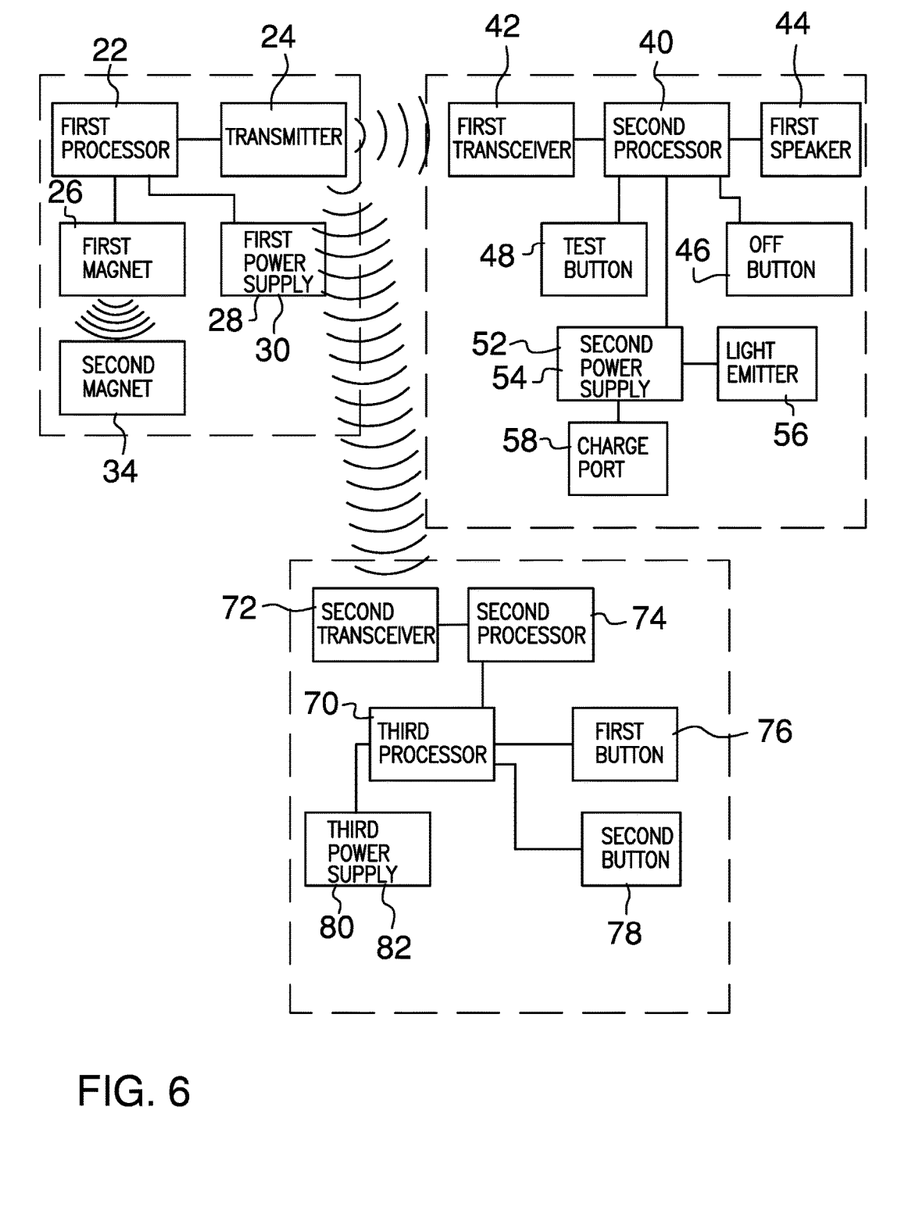
FIG. 6 is a schematic view of an embodiment of the disclosure.

With reference now to the drawings, and in particular to FIGS. 1 through 6 thereof, a new warning device embodying the principles and concepts of an embodiment of the disclosure and generally designated by the reference numeral 10 will be described.

As best illustrated in FIGS. 1 through 6, the vehicle occupancy warning system 10 generally comprises a vehicle 12 that has a driver's side door 14 and a back seat. A child may be selectively seated in the back seat and the driver's side door 14 is selectively positioned between an open position and a closed position. The vehicle 12 may be a passenger vehicle or the like and the vehicle 12 has an electrical system 16. The electrical system 16 may include a computer and a usb port.

A sensing unit 18 is provided and the sensing unit 18 is coupled to the vehicle 12. The sensing unit 18 is aligned with the driver's side door 14 such that the sensing unit 18 senses when the driver's side door 14 is positioned in the open position and the closed position. The sensing unit 18 comprises a first housing 20 that is coupled to the vehicle 12. The first housing 20 may be retained on the vehicle 12 with an adhesive or other non-permanent means of bonding the first housing 20 to the vehicle 12. The first housing 20 is positioned in an interior of the vehicle 12 and the first housing 20 is aligned with the driver's side door 14.

A first processor 22 is positioned within the first housing 20 and the first processor 22 selectively generates an alert sequence. The first processor 22 may be an electronic processor or the like. A transmitter 24 is positioned within the first housing 20 and the transmitter 24 is electrically coupled to the first processor 22. The transmitter 24 may be a radio frequency transmitter 24 or the like.

A first magnet 26 is coupled to the first housing 20 and the first magnet 26 is electrically coupled to the first processor 22. A first power supply 28 is positioned within the first housing 20 and the first power supply 28 is electrically coupled to the first processor 22. The first power supply 28 comprises at least one battery 30.

A second housing 32 is provided and the second housing 32 is coupled to the door 14. The second housing 32 is aligned with the first housing 20 when the door 14 is positioned in the closed position. Moreover, the second housing 32 is spaced from the first housing 20 when the door 14 is positioned in the open position. A second magnet 34 is coupled to the second housing 32. The second magnet 34 is in electromagnetic communication with the first magnet 26 when the door 14 is in the closed position. The second magnet 34 is removed from electromagnetic communication with the first magnet 26 when the door 14 is in the open position. Moreover, the first processor 22 generates the alarm sequence when the first magnet 26 is not in electromagnetic communication with the second magnet 34.

An alarm unit 36 is provided and the alarm unit 36 is positioned within the vehicle 12. The alarm unit 36 is in electrical communication with the sensing unit 18. The alarm unit 36 emits an audible alarm when the sensing unit 18 senses that the driver's side door 14 is in the open position. In this way the alarm unit 36 reminds a driver to check for the child in the back seat thereby inhibiting the child from being left unattended in the vehicle 12.

The alarm unit 36 comprises a third housing 38 that is positioned within the vehicle 12 and the third housing 38 may be positioned on the vehicle 12's dashboard. A second processor 40 is positioned within the third housing 38 and the second processor 40 may be an electronic processor or the like. A first transceiver 42 is positioned within the third housing 38 and the first transceiver 42 is electrically coupled to the second processor 40. The first transceiver 42 is in electrical communication with the transmitter 24 such and first transceiver 42 communicates to the second processor 40 that the first processor 22 has generated the alert sequence. The first transceiver 42 may be a radio frequency transceiver or the like.

A first speaker 44 is coupled to the third housing 38 to selectively emit the audible alarm outwardly from the third housing 38. The first speaker 44 is electrically coupled to the second processor 40. The second processor 40 turns the first speaker 44 on when the second processor 40 receives the alert sequence from the first processor 22.

An off button 46 is movably coupled to the third housing 38 and the off button 46 is electrically coupled to the second processor 40. The off button 46 turns the first speaker 44 off when the off button 46 is manipulated. A test button 48 is movably coupled to the third housing 38 and the test button 48 is button is electrically coupled to the second processor 40. The test button 48 temporarily turns the first speaker 44 on when the test button 48 is manipulated.

A figurine 50 is provided and the figurine 50 is coupled to a top side of the third housing 38. The figurine 50 has a pair of legs, a body, a pair of arms and a head. Thus, the figurine 50 has an ornamental appearance of an animal. The animal may be a bear, a human being or other bipedal or quadrupedal animal. Moreover, the human being may be constructed to represent a selected one of a Caucasian, an African or any other race of human being.

A second power supply 52 is provided and the second power supply 52 is coupled to the third housing 38. The second power supply 52 is electrically coupled to the second processor 40. The second power supply 52 comprises at least one battery 54 that is positioned within the third housing 38. The at least one battery 54 corresponding to the second power supply 52 is electrically coupled to the second processor 40.

A light emitter 56 is coupled to the third housing 38 and the light emitter 56 selectively emits light outwardly therefrom. The light emitter 56 is electrically coupled to the at least one battery 54 corresponding to the second power supply 52. Moreover, the light emitter 56 is turned on when the at least one battery 54 corresponding to the second power supply 52 reaches a minimum charge. The light emitter 56 may be an LED or the like.

A charge port 58 is coupled to the third housing 38 and the charge port 58 is electrically coupled to the second processor 40. A charge cord 60 is provided that has a first end 62 and a second end 64. The first end 62 is selectively electrically coupled to the charge port 58 and the second end 64 is selectively electrically coupled to an electrical outlet 66 in the vehicle 12. In this way the charge cord 60 charges the at least one battery 54 corresponding to the second power supply 52. The charge cord 60 may be a usb cord or the like electrical outlet 66 in the vehicle 12 may be a usb port.

A fourth housing 68 is provided and the fourth housing 68 may be carried. Additionally, the fourth housing 68 may be coupled to a key ring or the like. A third processor 70 is provided and the third processor 70 is positioned within the fourth housing 68. A second transceiver 72 is positioned within the fourth housing 68 and the second transceiver 72 is electrically coupled to the third processor 70. The second transceiver 72 is in electrical communication with the first transceiver 42 and the second transceiver 72 may be a radio frequency transceiver or the like.

A second speaker 74 is provided and the second speaker 74 is coupled to the fourth housing 68. The second speaker 74 selectively emits audible sounds outwardly from the fourth housing 68. The second speaker 74 is electrically coupled to the third processor 70 and the second speaker 74 is turned on when the first processor 22 generates the alert sequence.

A first button 76 is movably coupled to the fourth housing 68 wherein the first button 76 is configured to be manipulated. The first button 76 is electrically coupled to the third processor 70 and the first button 76 turns the second speaker 74 off. A second button 78 is movably coupled to the fourth housing 68 and the second button 78 is electrically coupled to the third processor 70. The second button 78 temporarily turns the second speaker 74 on to test the second speaker 74. A third power supply 80 is positioned within the fourth housing 68 and the third power supply 80 is electrically coupled to the third processor 70. The third power supply 80 comprises at least one battery 82.

In use, the first magnet 26 detects the second magnet 34 when the driver's side door 14 is positioned in the closed position. The first processor 22 generates the alert sequence when the driver's side door 14 is positioned in the open position and the first magnet 26 no longer detects the second magnet 34. Thus, each of the first speaker 44 and the second speaker 74 emit the audible alarm to remind the driver to check for the child in the back seat. In this way the driver is inhibited from leaving the child unattended in the vehicle 12 and exposing the child to potentially life threatening temperatures in the vehicle 12. The off button 46 is selectively manipulated to turn the first speaker 44 off and the first button 76 is selectively manipulated to turn the second speaker 74 off.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle occupancy warning system being configured to alert when a child is left in a vehicle, said system comprising:
    a vehicle having a door and a back seat, said back seat being configured to have a child seated therein, said door being selectively positioned between an open position and a closed position;
    a sensing unit being coupled to said vehicle, said sensing unit having a first housing, said sensing unit being aligned with said door such that said sensing unit senses when said door is positioned in said open position and said closed position;
    a second housing being coupled to said door;
    an alarm unit being positioned within said vehicle, said alarm unit being in electrical communication with said sensing unit, said alarm unit emitting an audible alarm when said sensing unit senses that said door is in said open position wherein said alarm unit is configured to remind a driver to check for the child in said back seat thereby inhibiting the child from being left unattended in said vehicle, said alarm unit comprising
        a third housing being positioned within said vehicle,
        a second processor being positioned within said third housing,
        a fourth housing being configured to be carried, and
        a third processor being positioned within said fourth housing;
    a figurine being coupled to said alarm unit, said figurine having a pair of legs, a body, a pair of arms and a head wherein said figurine is configured to have an ornamental appearance of an animal;
    a transmitter;
    a first processor selectively generating an alert sequence;
    a first transceiver being positioned within said third housing, said first transceiver being electrically coupled to said second processor, said first transceiver being in communication with said transmitter such that said first transceiver communicates to said second processor that said first processor has generated said alert sequence;
    a first speaker being coupled to said third housing wherein said first speaker is configured to emit the audible alarm outwardly therefrom, said first speaker being electrically coupled to said second processor, said second processor turning said first speaker on when said second processor receives said alert sequence from said first processor;
    an off button being movably coupled to said third housing wherein said off button is configured to be manipulated, said off button being electrically coupled to second processor, said off button turning said first speaker off when said off button is manipulated;
    a test button being movably coupled to said third housing wherein said test button is configured to be manipulated, said test button being button being electrically coupled to said second processor, said test button temporarily turning said speaker on when said test button is manipulated; and
    a second power supply being coupled to said third housing, said second power supply being electrically coupled to said second processor, said second power supply comprising
        at least one battery being positioned within said third housing, said at least one battery corresponding to said second power supply being electrically coupled to said second processor,
        a light emitter being coupled to said third housing wherein said light emitter is configured to selectively emit light outwardly therefrom, said light emitter being electrically coupled to said at least one battery corresponding to said second power supply, said light emitter being turned on when said at least one battery corresponding to said second power supply reaches a minimum charge,
        a charge port being coupled to said third housing, said charge port being electrically coupled to said second processor, and
        a charge cord having a first end and a second end, said first end being selectively electrically coupled to said charge port, said second end being selectively electrically coupled to an electrical outlet in said vehicle to charge said at least one battery corresponding to said second power supply.

2. The assembly according to claim 1, further comprising said sensing unit comprises said first housing being coupled to said vehicle, said first housing being positioned in an interior of said vehicle, said first housing being aligned with said door.

3. The assembly according to claim 2, further comprising:
    a first processor being positioned within said first housing, said first processor selectively generating an alert sequence; and
    a transmitter being positioned within said first housing, said transmitter being electrically coupled to said first processor.

4. The assembly according to claim 3, further comprising a first magnet being coupled to said first housing, said first magnet being electrically coupled to said first processor.

5. The assembly according to claim 3, further comprising a first power supply being positioned within said first housing, said first power supply being electrically coupled to said first processor, said first power supply comprising at least one battery.

6. The assembly according to claim 2, further comprising said second housing being aligned with said first housing when said door is positioned in said closed position, said second housing being spaced from said first housing when said door is positioned in said open position.

7. The assembly according to claim 6, further comprising:
    a first magnet; and
    a second magnet being coupled to said second housing, said second magnet being in electromagnetic communication with said first magnet when said door is in said closed position, said second magnet being removed from electromagnetic communication with said first magnet when said door is in said open position, said first processor generating said alarm sequence when said first magnet is not in electromagnetic communication with said second magnet.

8. The assembly according to claim 1, further comprising: a second transceiver being positioned within said fourth housing, said second transceiver being electrically coupled to said third processor, said second transceiver being in communication with said first transceiver.

9. The assembly according to claim 1, further comprising: a second speaker being coupled to said fourth housing wherein said second speaker is configured to emit audible sounds outwardly therefrom, said second speaker being electrically coupled to said third processor, said second speaker being turned on when said first processor generates said alert sequence.

10. The assembly according to claim 1, further comprising:
a first button being movably coupled to said fourth housing wherein said first button is configured to be manipulated, said first button being electrically coupled to said third processor; and
a second button being movably coupled to said fourth housing wherein said second button is configured to be manipulated, said second button being electrically coupled to said third processor.

11. The assembly according to claim 1, further comprising a third power supply being positioned within said fourth housing, said third power supply being electrically coupled to said third processor, said third power supply comprising at least one battery.

12. A vehicle occupancy warning system being configured to alert when a child is left in a vehicle, said system comprising:
a vehicle having a door and a back seat, said back seat being configured to have a child seated therein, said door being selectively positioned between an open position and a closed position;
a sensing unit being coupled to said vehicle, said sensing unit being aligned with said door such that said sensing unit senses when said door is positioned in said open position and said closed position, said sensing unit comprising:
a first housing being coupled to said vehicle, said first housing being positioned in an interior of said vehicle, said first housing being aligned with said door,
a first processor being positioned within said first housing, said first processor selectively generating an alert sequence,
a transmitter being positioned within said first housing, said transmitter being electrically coupled to said first processor,
a first magnet being coupled to said first housing, said first magnet being electrically coupled to said first processor,
a first power supply being positioned within said first housing, said first power supply being electrically coupled to said first processor, said first power supply comprising at least one battery,
a second housing being coupled to said door, said second housing being aligned with said first housing when said door is positioned in said closed position, said second housing being spaced from said first housing when said door is positioned in said open position, and
a second magnet being coupled to said second housing, said second magnet being in electromagnetic communication with said first magnet when said door is in said closed position, said second magnet being removed from electromagnetic communication with said first magnet when said door is in said open position, said first processor generating said alert sequence when said first magnet is not in electromagnetic communication with said second magnet; and
an alarm unit being positioned within said vehicle, said alarm unit being in electrical communication with said sensing unit, said alarm unit emitting an audible alarm when said sensing unit senses that said door is in said open position wherein said alarm unit is configured to remind a driver to check for the child in said back seat thereby inhibiting the child from being left unattended in said vehicle, said alarm unit comprising:
a third housing being positioned within said vehicle,
a second processor being positioned within said third housing,
a first transceiver being positioned within said third housing, said first transceiver being electrically coupled to said second processor, said first transceiver being in communication with said transmitter such that said first transceiver communicates to said second processor that said first processor has generated said alert sequence,
a first speaker being coupled to said third housing wherein said first speaker is configured to emit the audible alarm outwardly therefrom, said first speaker being electrically coupled to said second processor, said second processor turning said first speaker on when said second processor receives said alert sequence from said first processor,
an off button being movably coupled to said third housing wherein said off button is configured to be manipulated, said off button being electrically coupled to said second processor, said off button turning said first speaker off when said off button is manipulated,
a test button being movably coupled to said third housing wherein said test button is configured to be manipulated, said test button being button being electrically coupled to said second processor, said test button temporarily turning said first speaker on when said test button is manipulated,
a figurine being coupled to said third housing, said figurine having a pair of legs, a body, a pair of arms and a head wherein said figurine is configured to have an ornamental appearance of an animal, and
a second power supply being coupled to said third housing, said second power supply being electrically coupled to said second processor, said second power supply comprising:
at least one battery being positioned within said third housing, said at least one battery corresponding to said second power supply being electrically coupled to said second processor,
a light emitter being coupled to said third housing wherein said light emitter is configured to selectively emit light outwardly therefrom, said light emitter being electrically coupled to said at least one battery corresponding to said second power supply, said light emitter being turned on when said at least one battery corresponding to said second power supply reaches a minimum charge,
a charge port being coupled to said third housing, said charge port being electrically coupled to said second processor, a charge cord having a first end and a second end, said first end being selectively electrically coupled to said charge port, said second end being selectively electrically coupled to an electrical outlet in said vehicle to charge said at least one battery corresponding to said second power supply, a fourth housing being configured to be carried, a third processor being positioned within said fourth housing, a second transceiver being positioned within said fourth housing, said second transceiver being electrically coupled to said third processor, said second transceiver being in communication with said first transceiver, a second speaker being coupled to said fourth housing wherein said second speaker is configured to emit audible sounds outwardly therefrom, said second speaker being electrically coupled to said third processor, said second speaker being turned on when said first processor generates said alert sequence, a first button being movably coupled to said fourth housing wherein said first button is configured to be manipulated, said first button being electrically coupled to said third processor, a second button being movably coupled to said fourth housing wherein said second button is configured to be manipulated, said second button being electrically coupled to said third processor, and a third power supply being positioned within said fourth housing, said third power supply being electrically coupled to said third processor, said third power supply comprising at least one battery.

* * * * *